United States Patent [19]

The et al.

[11] Patent Number: 4,609,534
[45] Date of Patent: Sep. 2, 1986

[54] LIME CLEANING PROCESS TO REMOVE MANGANESE OXIDE

[75] Inventors: Paul J. The, Murrysville, Pa.; William V. Felix, Little Rock, Ark.

[73] Assignee: Aluminum Company of America, Pittsburgh, Pa.

[21] Appl. No.: 658,649

[22] Filed: Oct. 9, 1984

[51] Int. Cl.$^4$ .............................................. C01G 45/10
[52] U.S. Cl. ..................... 423/49; 423/119; 423/120; 423/121; 423/625
[58] Field of Search ................. 423/635, 636, 605, 49, 423/119, 120, 121, 127, 625

[56] References Cited

U.S. PATENT DOCUMENTS 3,796,789   3/1974   Adams .................................. 423/122
4,519,989   5/1985   Pearson et al. ....................... 423/121

FOREIGN PATENT DOCUMENTS 1489775   7/1967   France ................................. 423/119
325811   11/1973   U.S.S.R. ............................. 423/119
481543   8/1975   U.S.S.R. ............................. 423/119

*Primary Examiner*—John Doll
*Assistant Examiner*—Jackson Leeds
*Attorney, Agent, or Firm*—Brian D. Smith

[57] ABSTRACT

A process for cleaning lime having undesirable levels of contaminants, particularly manganese oxide, is disclosed. The process includes leaching the contaminants from the lime with an aqueous means, preferably spent Bayer liquor, to form a slurry containing said impurities and cleaned lime. The cleaned lime is then removed from the slurry containing the contaminants.

18 Claims, 1 Drawing Figure

LIME CLEANING PROCESS TO REMOVE MANGANESE OXIDE

BACKGROUND OF THE INVENTION

The invention relates generally to processes for cleaning lime having high levels of contaminants. More particularly, the invention relates to a process for cleaning lime containing manganese oxide contaminants so that such cleaned lime can be used in the Bayer Process to lower the iron content of Bayer liquor without causing manganese oxide contamination in the product alumina.

Alumina is conventionally recovered from bauxite and similar alumina-bearing ores by a process generally referred to as the Bayer Process. The process recovers alumina from the ore by digesting the ore with caustic liquor which dissolves most of the alumina into the liquor. That which remains undissolved is generally referred to as red mud. Red mud primarily contains unwanted ore constituents, such as iron, titanium and desilication product. However, some undissolved alumina is also usually present. After digestion, the liquor is typically removed from the red mud by decantation and filtration. Aluminum trihydroxide is then precipitated from the remaining liquor and calcined to form alumina. Precipitation usually involves cooling and mixing of the liquor (which is supersaturated and sometimes called green or pregnant liquor) with a slurry of aluminum trihydroxide or alumina trihydrate in spent Bayer liquor which acts as a seed to induce formation of its own species. The slurry is then typically pumped through a classification system which separates the slurry into a coarse fraction of crystallized aluminum trihydroxide and a fine fraction of remaining aluminate liquor. The liquor, at this point, is typically referred to as spent Bayer liquor. The spent Bayer liquor is then generally concentrated by evaporation and recycled to the digester where it is mixed with incoming ore.

Certain types of bauxite contain higher than normal levels of pyrite, siderite and silica. During digestion of such bauxite, the silica contained therein reacts with aluminate and caustic species in the digester to form an insoluble zeolite type compound generally referred to as the desilication product. The desilication product results in a loss of soda and alumina by chemically binding the soda and alumina. To recover such lost alumina and soda, the desilication product is subjected to a lime soda sintering process such as that disclosed in U.S. Pat. No. 3,796,789 to Adams which is hereby incorporated by reference. Such sintering processes often use oil in the sintering kilns for economic reasons instead of natural gas. Oil, however, causes additional sulfur compounds to form in the spent liquor. When such spent liquor is recycled to the digester, as in the conventional Bayer Process, these additional sulfur compounds, together with that contributed by the pyrite from bauxite, apparently peptize the Fe(II) particles of the siderite to form charged $Fe_2O_3$ colloidal species of highly hydrated states which are too small to be removed completely during the filtration process and, thus, are precipitated along with the aluminum trihydroxide. Alumina having high levels of $Fe_2O_3$ is characterized by having an undesirable pink color instead of the typical commercial grade white. When this $Fe_2O_3$ level exceeds 0.05% by weight in the calcined product, i.e., alumina, the quality of chemical products produced therewith is adversely affected.

Numerous methods have been reported in the literature for lowering the iron level in Bayer liquor. These include, for example, filtration through the use of iron grit or sand, step precipitation, filter precoat, magnetic separation, oxidation of the sulfur compound in the liquor, addition of zinc to form slightly soluble zinc compounds, and the addition of lime to the green liquor, such as that disclosed by Adams in U.S. Pat. No. 3,796,789. All of these methods, except the last one, are generally unattractive from an economic standpoint in that they involve additional equipment and a more complicated treatment process such as regeneration of the additive which may also, depending on the additive, introduce additional contaminants in the liquor stream. In addition, while most of these methods have been demonstrated to lower $Fe_2O_3$ content in the liquor, most require spot checking to see whether they are also effectively lowering $Fe_2O_3$ level in the precipitated alumina without introducing other contaminants. For example, the addition of commercial lime to the settler overflow liquor seems to be harmless, yet if it is not carefully watched and controlled, it will introduce excessive contaminants in the precipitated aluminum trihydroxide, thereby rendering the method commercially unattractive.

Lime's ability to lower the iron content of the liquor is believed to be due to its presence in sufficient concentration which causes rapid precipitation of its hydroxide, carbonate and aluminate, which enmesh the colloidal iron species as they are formed. This behavior is generally referred to as the "enmeshment" mechanism.

While the addition of lime is an effective way of lowering iron content in Bayer liquor, many desirable (i.e., inexpensive and locally available) sources of lime contain high levels of contaminants, such as manganese oxide, which are not trapped by the enmeshment mechanism. Manganese oxide is particularly troublesome because, in addition to avoiding "enmeshment", it precipitates out with the aluminum trihydroxide. If present in contaminating quantities, it will discolor the product alumina, giving it a pink, instead of white, look. Whiteness generally indicates that the alumina is relatively pure. If, however, white alumina could be produced with such contaminated lime, production costs could be lowered. Accordingly, an economical method of producing white, commercial grade alumina using such contaminated lime would be most desirable.

SUMMARY OF THE INVENTION

The present invention provides an economical method for cleaning lime containing impurities such as manganese oxide. The process includes leaching the impurities from the lime with an aqueous means, preferably spent Bayer liquor, to form a slurry containing the impurities and the cleaned lime. The cleaned lime is then removed from the slurry.

In a preferred embodiment, the cleaned lime is removed from the slurry by filtration which causes the cleaned lime to collect on a filtering surface in the form of a lime cake. Further cleaning of the lime is effected by washing the lime cake with additional spent Bayer liquor. The remaining slurry or filtrate containing the contaminants having been leached and washed from the lime cake is then recycled to a Bayer Process digester wherein alumina-bearing source material is leached with lime and sodium hydroxide to form sodium aluminate liquor. The cleaned lime can be added to the sodium aluminate liquor where it serves to lower the liquor's iron content and act as a filtering aid in removing red mud from the Bayer Process overflow liquor.

Accordingly, an object of the present invention is to provide an economical method of cleaning lime having high levels of contaminants, such as manganese oxide.

Another object of the present invention is to provide a locally available low-cost source of lime which can be used to lower the iron content of sodium aluminate liquor produced by the Bayer Process.

Another object of the present invention is to provide a low-cost source of lime which can be used in the Bayer Process as a filtering aid which increases the filtration rate of solids, such as red mud being filtered from the sodium aluminate liquor.

Yet another object of the present invention is to provide a process for partial causticization of spent Bayer liquor which can be recycled to the digester in accordance with conventional Bayer Process procedure.

DETAILED DESCRIPTION OF THE DRAWING

Figure 1:
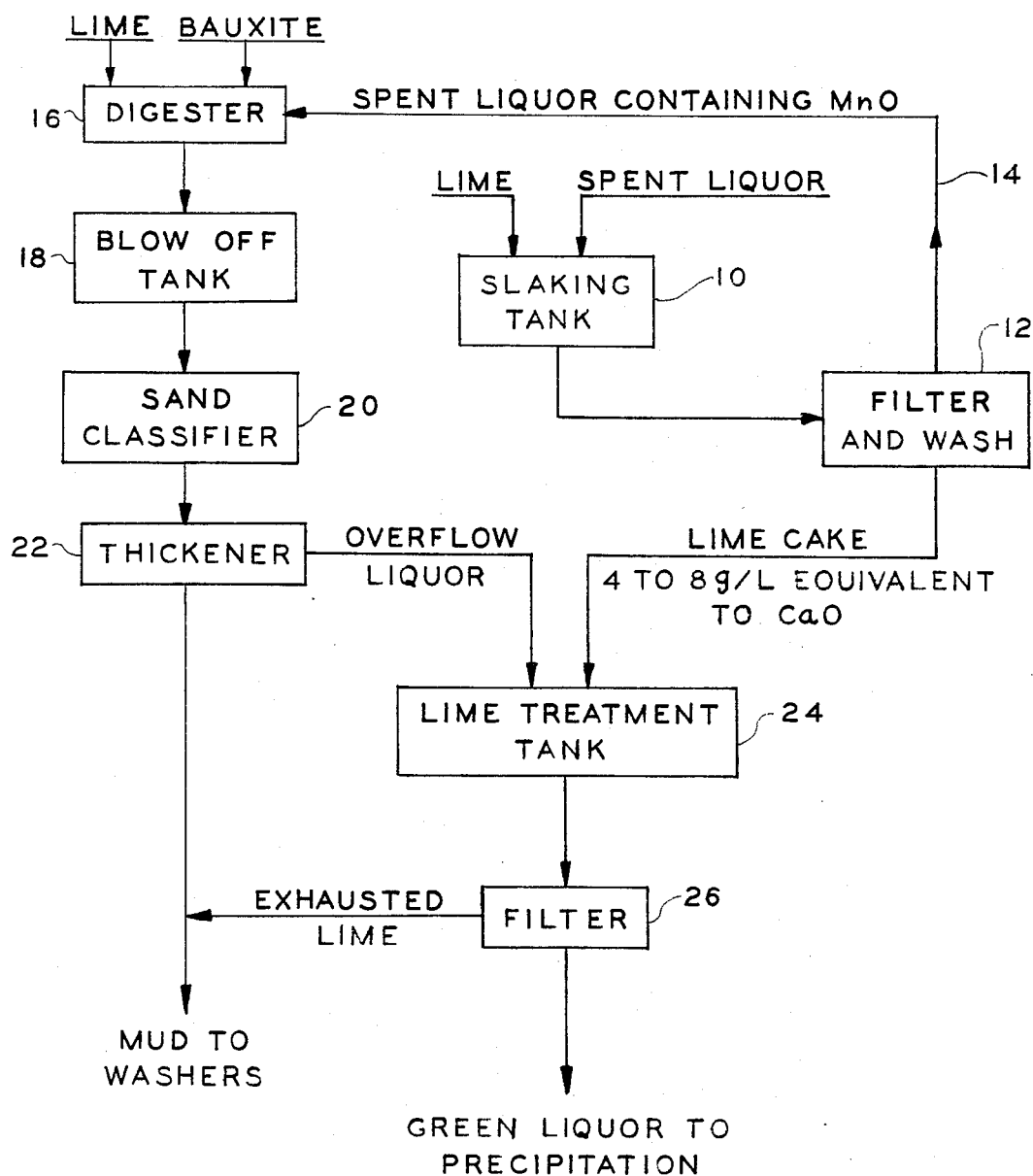
FIG. 1 illustrates a flow sheet for controlling $Fe_2O_3$ and manganese oxide in alumina produced by the Bayer Process.

FIG. 1 illustrates a preferred embodiment of the invention wherein lime having high levels of manganese oxide is cleaned and then used in the conventional Bayer Process to reduce the iron content of Bayer liquor which results from the use of bauxite having high levels of pyrite, siderite and silica.

Lime having high levels of manganese oxide contaminant is mixed in a slaking tank 10 with spent liquor from the Bayer Process. The lime is added in amounts of about 4 to 8 grams per 0.1 to 1 liter of spent Bayer liquor and then mixed or slaked in tank 10 at a temperature around 95° C., preferably between about 85° and 110° C. The spent liquor quickly leaches or extracts the manganese oxide from the lime to form a slaked lime slurry in slaking tank 10. Spent Bayer liquor is the most preferred leaching medium; however, other aqueous means, particularly other Bayer process produced liquors, such as green liquor, which are suitable for leaching manganese oxide and other contaminants are considered to be within the purview of the present invention.

After slaking in tank 10, the slaked slurry is filtered at 12, preferably in a Kelly filter press, to remove the cleaned or leached lime from the slurry which now contains manganese oxide contaminants. The cleaned lime collects on the filtering surface of the filter in the form of a lime cake. Further manganese oxide contaminants can be removed from the lime cake by washing it with a minimal amount of spent liquor. The filtrate or remaining slurry containing the manganese oxide contaminants is the recycled via line 14 to a Bayer Process digester 16. While filtration is one means for removing cleaned lime from the slurry, other means such as centrifugation are considered to be within the purview of the present invention.

In accordance with the conventional Bayer Process, digester 16 digests bauxite with lime and caustic soda at conventional Bayer Process temperatures and pressures to form sodium aluminate liquor which contains most of the desired alumina and an undissolved solids portion generally referred to as red mud. After digestion, the solids and liquor are brought back to atmospheric pressure in blow-off tank 18. A portion of red mud solids apparently absorbs the manganese oxide contaminants from the filtrate to form a rather heavy, gritty substance having the look of black sand. The black sand is removed from the remaining red mud solids and liquor by a sand classifier 20.

After black sand removal at 20, the remaining mixture of red mud solids and Bayer liquor is conveyed to a thickener or settling tank 22 which facilitates settling of the remaining red mud from the Bayer liquor. The Bayer liquor supernatant or overflow liquor, as it is generally called at this point, is then decanted from the surface of the red mud and conveyed to a lime treatment tank 24. In tank 24, cleaned lime in the form of lime cake from filtering means 12 is added to the overflow liquor to absorb colloidal $Fe_2O_3$ particles. It is preferred to add from about 4 to 8 grams per liter of clean lime to the overflow liquor. The lime containing the adsorbed $Fe_2O_3$ is then at 26 filtered from the remaining Bayer liquor which, at this point, is generally referred to as green liquor. The green liquor is then typically mixed with a slurry of aluminum trihydroxide which acts as a seed to induce precipitation of its own species (i.e., aluminum trihydroxide). The exhausted lime, along with red mud from tank 22, is then preferably washed and subjected to a sintering process similar to that disclosed in U.S. Pat. No. 3,796,789 to Adams which enables recovery of any remaining alumina in the red mud and lime.

Lime added to lime treatment tank 24 in accordance with the present invention also acts as a filter aid in filter 26 by increasing the filtration rate of solids from the liquor. The lime mixes with the solids to form a mixture having less specific area for filtering than the solids would have alone (i.e., without the added lime). Accordingly, with specific surface area decreased, filtration rates increase. Moreover, lime, in accordance with the present invention, can be added as a filter aid irrespective as to whether there is any need to reduce iron content in the Bayer liquor. Those skilled in the relevant art will also appreciate that the present invention results in the partial causticization of spent Bayer liquor when such liquor is used to leach manganese oxide from lime having manganese oxide contamination.

EXAMPLE

Laboratory autoclave digests were performed with 3 liters of spent Bayer liquor and corresponding amounts of synthetic liquor having compositions described in Table I below.

TABLE I

| | Analyses of the Start Liquors | | |
|---|---|---|---|
| | Spent Liquor g/l | Synthetic Washer O'flow Liquor g/l | Synthetic Lake Water g/l |
| $Al_2O_3$ | 54.0 | 33.3 | 7.0 |
| TC | 167.8 | 62.6 | 13.3 |
| TA | 204.8 | 82.9 | 22.0 |
| $SiO_2$ | 0.3 | | |
| $Na_2SO_4$ | 24.2 | | |
| $Fe_2O_3$ | 0.005 | | |

The low temperature digest conditions used in the experiments are set forth in Table II below.

TABLE II

Low Temperature Digest Conditions

| | |
|---|---|
| Bauxite charge: | bauxite (composition described in TABLE III) |
| $Al_2O_3$/TC ratio: | 0.63 |
| Lime: | 1.1 g/l |
| Digest Temp.: | 143° C. |
| Time: | 30 minutes |
| Starch: | 0.8 g/kg bauxite (added as 1% causticized solution) |

TABLE III

Analysis of Bauxite

| Components % | (4-2 NW 15) |
|---|---|
| $SiO_2$ | 8.51 |
| r-$SiO_2$ | 4.73 |
| $Fe_2O_3$ | 5.33 |
| $TiO_2$ | 2.96 |
| $Al_2O_3$ | 51.2 |
| a-$Al_2O_3$ | 41.1 |
| CaO | 0.06 |
| MnO | 0.14 |
| $Cr_2O_3$ | 0.03 |
| $P_2O_5$ | 0.17 |
| $ZrO_2$ | 0.36 |
| CuO | 0.01 |
| ZnO | 0.01 |
| $Ga_2O_3$ | 0.02 |
| LOF | 30.3 |
| Total C | 0.80 |
| $CO_2$ | 1.98 |
| Total S | 0.21 |
| Pyritic S | 0.16 |
| Sulfate S | 0.05 |
| FeO | 3.22 |

TABLE IV

Analysis of Lime

| % | |
|---|---|
| Total CaO | 89.4 |
| Avail. CaO | 76.7 |
| $Al_2O_3$ | 0.38 |
| $Fe_2O_3$ | 0.51 |
| $SiO_2$ | 0.81 |
| $CO_2$ | 1.90 |
| MnO | 0.27 |
| LOI | 2.20 |

Appropriate amounts of NaOH pellets were added to make up for soda losses. The blow-off slurries were desanded, treated with the appropriate amount of causticized starch solution and settled. The supernatant overflow liquors were separated from the settled mud by decantation. Various amounts of lime cake were added to the supernatant green liquor, simulating thickener overflow. The lime cakes were obtained by slaking 4 to 8 grams of low cost, locally available lime (having a composition described in Table IV) in 100 to 1000 cc of different slaking media at 95° C. for 15 minutes, followed by filtration and washing with 100 cc of the corresponding liquor. The lime cake treatment consisted of an intimate mixing for 15, 30 or 60 minutes at 95° C. The filtered green liquor was adjusted to precipitation temperature, seeded with 37.5 grams of dry, relatively pure aluminum trihydroxide and precipitated in round polyethylene bottles rotated for 24 hours at 65.5° C. Products were filtered using No. 42 Whatman paper, washed with 2 liters of hot distilled water, dried, weighed and submitted for inductivity coupled plasma analysis.

Caustic and quick lime are harmful materials. Caustic is hazardous, corrosive, toxic, and causes skin irritation. In addition, the dissolution of sodium hydroxide to form a more caustic concentrated solution liberates a significant amount of heat which additionally expels a pungent odor in the atmosphere. Moreover, handling the lime creates dust which also contaminantes the working atmosphere. When such lime particles are inhaled or collected on the skin, they undergo hydration and cause sore throats or burned skin areas.

To minimize these hazards, the engineers and technicians conducting these experiments wore protective equipment such as gloves, goggles, face shields and hard hats. Suitable respiration protection was also used when handling large amounts of lime and dissolving caustic. The addition of solid lime to a caustic solution or water was handled with extreme care to prevent the aforementioned excessive heat liberation which results in boiling and splashing of the solution. Laboratory jackets or aprons also minimize contact between caustic solution and human skin. Application of this process in a plant will involve the same hazards and require the same protective equipment as described for the experimental work.

In these experiments, the $Fe_2O_3$ and manganese oxide contents of the precipitated aluminum trihydroxide were selected as parameters for characterizing the purity of the alumina produced. To eliminate the effect of any variation in the alumina yield which could have affected the percent $Fe_2O_3$ in alumina, the $Fe_2O_3$ content in alumina was expressed as grams pickup per liter liquor.

The effect of various types of slaking media used in these experiments is shown in Table V. The low manganese oxide contents of 0.0007 to 0.0011% by weight of alumina produced by using spent liquor as slaking medium as compared to 0.0023 to 0.0031% using synthetic liquors indicate the inability of synthetic liquors (i.e., the synthetic washer overflow liquor or synthetic lake water) to extract manganese oxide from the lime in the lime cake formation step which leads to manganese oxide contamination in alumina. It is postulated that the organic carbon in spent liquor promotes the dissolution of manganese oxide from lime during the slaking process. Table V also shows that the addition of such lime cake to the settler overflow liquor produced alumina with low levels of $Fe_2O_3$ as well as manganese oxide less than the maximum specification of 0.0025% on a calcined basis.

TABLE V

LIME ADDITION TO SETTLER OVERFLOW
(Effect of Slaking Media)

| g/l CaO Added | 0 | 0 | 6.1 | 6.1 | 6.1 | 6.1 | 3.1 |
|---|---|---|---|---|---|---|---|
| Method of & Addition | — | — | solid | slaked & filtered | slaked & filtered | slaked & filtered | slaked filtered |
| Slaking Media | — | — | — | synthetic lake water | synthetic washer overflow | spent liquor | spent liquor |
| Amount in cc | — | — | — | 1000 | 1000 | 1000 | 1000 |

TABLE V-continued

LIME ADDITION TO SETTLER OVERFLOW
(Effect of Slaking Media)

| Reaction Time in Lime Treatment Tank | — | — | 60 | 60 | 60 | 60 | 60 |
|---|---|---|---|---|---|---|---|
| Al$_2$O$_3$ Analysis | | | | | | | |
| % Fe$_2$O$_3$ | 0.034 | 0.040 | 0.013 | 0.020 | 0.017 | 0.013 | 0.016 |
| g/l Fe$_2$O$_3$[1] | 0.017 | 0.021 | 0.005 | 0.010 | 0.009 | 0.007 | 0.008 |
| % CaO | 0.033 | 0.039 | 0.049 | 0.036 | 0.033 | 0.042 | 0.053 |
| % MnO[2] | 0.0002 | 0.0005 | 0.0030 | 0.0031 | 0.0023 | 0.0011 | 0.0007 |

[1] pick up
[2] max. specifications = 0.0025%

The results of using various amounts of spent liquor to slake lime and the different mixing times in the lime treatment reactor are shown in Tables VI and VII. Lime cakes obtained by slaking 4 and 8 grams stone lime in 100 to 1000 cc spent liquor at 95° C. for 15 minutes followed by filtration and washing the cake with 100 cc spent liquor, when added to one liter thickener overflow liquor, lowered the Fe$_2$O$_3$ content of alumina from 0.034% to average values of 0.015 and 0.013%, respectively, with average manganese oxide contents of 0.0006 and 0.0011%, respectively, on a calcined basis. The amount of spent liquor used as slaking medium and mixing time in the lime treatment tank did not significantly affect the Fe$_2$O$_3$ and manganese oxide levels in the product alumina over the ranges tested.

Bayer Process overflow liquor to lower Fe$_2$O$_3$ content in the product alumina without causing excessive manganese oxide contamination in said product. Those skilled in the relevant art will also appreciate that the addition of such lime to the spent Bayer liquor partially causticizes the Bayer liquor. In addition, those so skilled will appreciate that the addition of cleaned lime to the thickener overflow increases the clear press filtration rate.

While the invention has been described in terms of preferred embodiments, the claims appended hereto are intended to encompass all embodiments which fall within the spirit of the invention.

What is claimed is:

1. A process for removing manganese oxide from lime comprising
   leaching the manganese oxide from the lime with sodium aluminate liquor produced by the Bayer

TABLE VI

LIME ADDITION TO SETTLER OVERFLOW
Effect of Reaction Time and Amount of Slaking Liquor
on Fe$_2$O$_3$ and MnO Contents in Product Alumina

| g/l CaO Added | 3.1 | 3.1 | 3.1 | 3.1 | 3.1 | 3.1 | 3.1 | 3.1 | 3.1 | Average |
|---|---|---|---|---|---|---|---|---|---|---|
| Method of Addition | | | | | slaked & filtered | | | | | |
| Slaking Media | | | | | spent liquor | | | | | |
| Amount in cc | 1000 | 1000 | 1000 | 500 | 500 | 500 | 100 | 100 | 100 | |
| Reaction Time in Lime Treatment Tank | 60 | 30 | 15 | 60 | 30 | 15 | 60 | 30 | 15 | |
| Al$_2$O$_3$ Analysis | | | | | | | | | | |
| % Fe$_2$O$_3$ | 0.017 | 0.016 | 0.015 | 0.014 | 0.016 | 0.014 | 0.015 | 0.015 | 0.014 | 0.015 |
| g/l Fe$_2$O$_3$[1] | 0.009 | 0.008 | 0.008 | 0.007 | 0.008 | 0.007 | 0.008 | 0.008 | 0.007 | 0.008 |
| % CaO | 0.057 | 0.054 | 0.049 | 0.039 | 0.039 | 0.039 | 0.051 | 0.054 | 0.041 | 0.047 |
| % MnO[2] | 0.0009 | 0.0010 | 0.0003 | 0.0007 | 0.0006 | 0.0007 | 0.0001 | 0.0002 | 0.0012 | 0.0006 |

[1] pick up
[2] max. specifications = 0.0025%

TABLE VII

LIME ADDITION TO SETTLER OVERFLOW
Effect of Reaction Time and Amount of Slaking Liquor
on Fe$_2$O$_3$ and MnO Contents in Product Alumina

| g/l CaO Added | 0 | 0 | 6.1 | 6.1 | 6.1 | 6.1 | 6.1 | 6.1 | 6.1 | 6.1 | 6.1 | Average |
|---|---|---|---|---|---|---|---|---|---|---|---|---|
| Method of Addition | | | | | | slaked & filtered | | | | | | |
| Slaking Media | | | | | | spent liquor | | | | | | |
| Amount in cc | — | — | 1000 | 1000 | 1000 | 500 | 500 | 500 | 100 | 100 | 100 | |
| Reaction Time in Lime Treatment Tank | — | — | 60 | 30 | 15 | 60 | 30 | 15 | 60 | 30 | 15 | |
| Al$_2$O$_3$ Analysis | | | | | | | | | | | | |
| % Fe$_2$O$_3$ | 0.034 | 0.040 | 0.012 | 0.013 | 0.014 | 0.013 | 0.011 | 0.013 | 0.016 | 0.013 | 0.016 | 0.013 |
| g/l Fe$_2$O$_3$[1] | 0.017 | 0.021 | 0.005 | 0.007 | 0.007 | 0.007 | 0.006 | 0.006 | 0.008 | 0.007 | 0.008 | 0.007 |
| % CaO | 0.033 | 0.039 | 0.039 | 0.045 | 0.042 | 0.030 | 0.051 | 0.075 | 0.033 | 0.039 | 0.032 | 0.043 |
| % MnO[2] | 0.0002 | 0.0005 | 0.0011 | 0.0012 | 0.0013 | 0.0009 | 0.0012 | 0.0007 | 0.0013 | 0.0015 | 0.0003 | 0.0011 |

[1] pick up
[2] max. specifications = 0.0025%

These results demonstrate that low cost, locally available lime having manganese oxide contamination can be cleaned with spent Bayer liquor and then added to process to form a slurry containing said manganese oxide and leached lime; and removing the leached lime from the slurry containing manganese oxide.

2. A process as recited in claim 1 wherein prior to leaching the lime contains about 0.27% by weight of manganese oxide.

3. A process as recited in claim 1 wherein the sodium aluminate liquor is spend Bayer liquor.

4. A process as recited in claim 1 wherein the clean lime is removed from the slurry by filtration.

5. A process as recited in claim 1 further comprising the step of washing the lime which has been removed from the slurry with more sodium aluminate liquor, said washing serving to further leach manganese oxide from the lime.

6. A process as recited in claim 1 wherein the lime having been removed from the slurry has a manganese oxide content which enables the production of white alumina containing less than about 0.34% by weight $Fe_2O_3$ and less than about 0.0011% by weight manganese oxide.

7. A process as recited in claim 1 further comprising adding leached lime having been removed from the slurry to a second sodium aluminate liquor to lower the second liquor's iron content.

8. A process as recited in claim 3 wherein the slurry is formed by adding about 4 to 8 grams of lime per liter of spent Bayer liquor.

9. A process as recited in claim 4 wherein during filtration the leached lime is collected on a filtering means in the form of a lime cake.

10. A process as recited in claim 9 wherein the filtering means is a filter press.

11. A process as recited in claim 1 further comprising recycling the slurry remaining after removal of leached lime therefrom to a digester in which an alumina-bearing source material is leached with lime and sodium hydroxide to form a second sodium aluminate liquor containing manganese oxide.

12. A process as recited in claim 11 wherein the alumina-bearing source is bauxite.

13. A process as recited in claim 12 wherein the bauxite contains pyrite, siderite and silica.

14. A process as recited in claim 11 further comprising the step of removing manganese oxide from the second sodium aluminate liquor containing manganese oxide.

15. A process as recited in claim 14 wherein the manganese oxide is removed by screening.

16. A process as recited in claim 7 wherein the leached lime is added to the second sodium aluminate liquor after said second liquor has been heated, digested under pressure, and then gradually brought back to atmospheric pressure.

17. A process for the production of alumina from sodium aluminate liquor resulting from caustic leaching of an alumina-bearing source material comprising
(a) heating said sodium aluminate liquor;
(b) digesting the heated sodium aluminate liquor under pressure;
(c) gradually bringing the sodium aluminate liquor back to atmospheric pressure;
(d) reducing the iron content of the sodium aluminate liquor by adding lime to the sodium aluminate liquor after said sodium aluminate liquor has been brought back to atmospheric pressure, said lime having been leached with spent Bayer liquor to remove manganese oxide therefrom prior to being added to said sodium aluminate liquor, said lime also having contained at least 0.27 weight percent manganese oxide prior to said leaching;
(e) separating solids from the sodium aluminate liquor after bringing said sodium aluminate liquor back to atmospheric pressure; and
(f) precipitating aluminum trihydroxide from the separated sodium aluminate liquor.

18. A process for the production of alumina from sodium aluminate liquor resulting from caustic leaching of an alumina-bearing source material comprising
(a) heating said sodium aluminate liquor;
(b) digesting the heated sodium aluminate liquor under pressure;
(c) gradually bringing the sodium aluminate liquor back to atmospheric pressure;
(d) filtering solids from the sodium aluminate liquor after bringing the sodium aluminate liquor back to atmospheric pressure;
(e) increasing the filtration rate of said solids from the sodium aluminate liquor by adding lime to the sodium aluminate liquor being filtered so as to form a mixture with said solids having less specific surface area for filtering than said solids would have had without having added said lime, said reduced specific surface area increasing said filtration rate, said lime having been leached with spent Bayer liquor to remove manganese oxide therefrom prior to being added to said sodium aluminate liquor, said lime also having contained at least 0.27 weight percent manganese oxide prior to said leaching; and
(f) precipitating aluminum trihydroxide from the sodium aluminate liquor remaining after filtering said solids therefrom.

* * * * *